Figure 1:
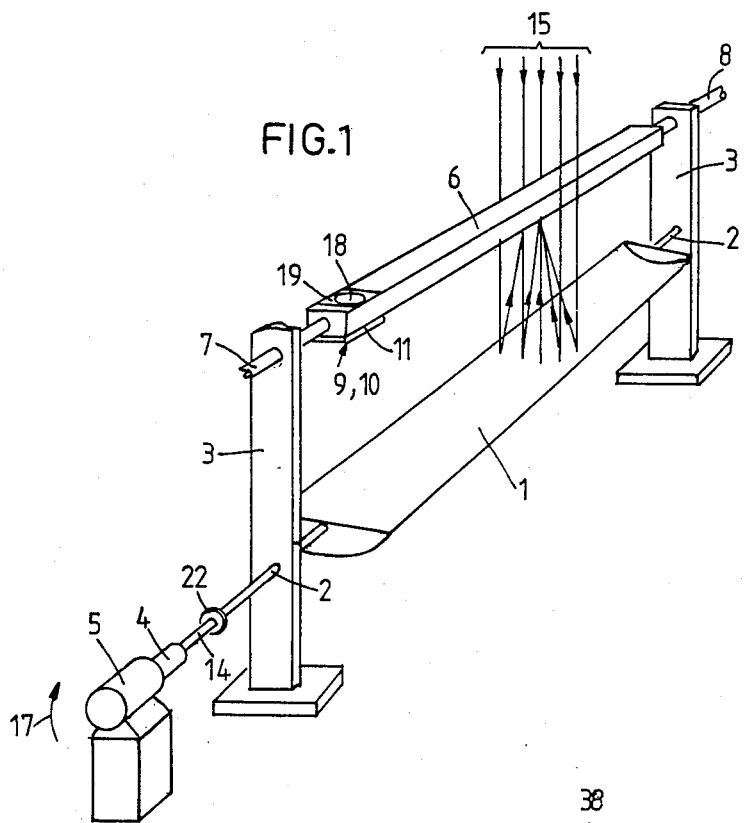

United States Patent [19]

Posnansky et al.

[11] Patent Number: 4,730,602
[45] Date of Patent: Mar. 15, 1988

[54] APPARATUS FOR AUTOMATICALLY DIRECTING SOLAR RADIATION FOCUSED BY A REFLECTOR

[76] Inventors: Mario Posnansky, Melchenbuhlweg 18, 3006 Bern, Switzerland; Hernan Posnansky, P.O. Box 17792, San Diego, Calif. 92117

[21] Appl. No.: 48,471

[22] PCT Filed: Jun. 16, 1983

[86] PCT No.: PCT/CH83/00076
§ 371 Date: Feb. 16, 1984
§ 102(e) Date: Feb. 16, 1984

[87] PCT Pub. No.: WO84/00068
PCT Pub. Date: Jan. 5, 1984

Related U.S. Application Data

[63] Continuation of Ser. No. 805,598, Dec. 10, 1985, abandoned, which is a continuation of Ser. No. 589,066, Feb. 16, 1984, abandoned.

[30] Foreign Application Priority Data

Jun. 16, 1982 [CH] Switzerland ............... 3728/82

[51] Int. Cl.$^4$ ................................. F21J 3/02
[52] U.S. Cl. .................................. 126/425; 126/438; 126/439; 350/633; 350/634; 350/636; 350/637; 250/203 R
[58] Field of Search ............... 126/425, 438, 439, 424; 350/637, 636, 634, 633, 632; 205/203 R

[56] References Cited

U.S. PATENT DOCUMENTS 4,158,356  6/1979  Wininger .................... 126/425
4,287,411  9/1981  Beucci ....................... 126/425 X
4,332,238  6/1982  Garcia, Jr. .................. 126/425

FOREIGN PATENT DOCUMENTS 2397625  2/1979  France .

Primary Examiner—Larry Jones
Attorney, Agent, or Firm—Oblon, Fisher, Spivak, McClelland & Maier

[57] ABSTRACT

For the tracking control of a reflector focusing the solar radiation on an absorber corresponding to the apparent movement of the sun, an adjusting mechanism of the reflector is driven by means of a direct-current motor 5. The terminals of the electric motor are connected to a parallel connection consisting of two solar cells (9, 10). The parallel connection of both solar cells is such that they generate by constant radiation about a similar amount of voltage however with opposite polarity. The driving of the direct current motor takes place with the voltage differential occurring on the parallel connection. Both the solar cells are rigidly mounted to that part of the stationary arranged absorber on which part the solarrays are focused by the reflector. Both the solar cells are arranged symmetrical to the longitudinal axis of the absorber. With the help of the above described apparatus the reflector is automatically always so adjusted that the solarrays are focused on the absorber whereby no additional source of energy is necessary to drive the adjusting mechanism of the reflector.

9 Claims, 5 Drawing Figures

U.S. Patent    Mar. 15, 1988    Sheet 1 of 2    4,730,602

APPARATUS FOR AUTOMATICALLY DIRECTING SOLAR RADIATION FOCUSED BY A REFLECTOR

This application is a continuation of application Ser. No. 06/805,598, filed on Dec. 10, 1985, now abandoned, which is a continuation of Ser. No. 06/589,066, filed on Feb. 16, 1984, now abandoned.

The invention relates to a solar radiation collection apparatus and more specifically a solar energy plant having a reflector which is adjusted to follow the path of the sun.

In U.S. Pat. No. 3,861,379 a solar collector is described which possesses for the control of tracking of the sun a photoelectric arrangement which is coupled to an adjusting mechanism via an electric motor. A second photoelectric arrangement is present so that in the case of an overcast sky, the rotation signal emanating from the first photoelectric arrangement for the electromagnetic arrangement is interrupted, and in this way a rotation of the reflectors is avoided. A time switch energized at the end of the day ensures that the motor causes the reflectors to return to the morning position. Such a suntracking system is complicated and accordingly expensive.

In CH patent specification No. 627,259 a solar collector having a solar radiation focusing reflector is described. Parallel to the axis of rotation of the reflector, an elongated absorber is disposed for receiving the solar radiation focused by the reflector. Sun-tracking means reacting to the solar radiation and actuating the adjusting mechanism are further provided for keeping the focusing of the solar radiation on the absorber. The sun-tracking means comprise two elongated sensor containers situated opposite the reflector and, viewed from the reflector reciprocally, extending at least for the most part on opposite sides of the absorber. In each of the containers there is a working medium which is, in operation, partially in the liquid phase and partially in the vapor phase, the vapor pressure of which is, through an evaporation-condensation process, proportional to the amount of solar radiation received from the respective container and from the reflectors. The two working-medium pressures are mutually and oppositely active upon the adjusting mechanism in such a way that a pressure differential occurring upon a deviation of the focusing at the absorber corrects the position of the reflectors for the said deviation. These known sun-tracking means are simpler in construction than the aforementioned sun-tracking means having photoelectric arrangements. On the other hand, however, pressure lines and two piston-cylinder drives are needed, which parts take up a relatively large space, and the installation of these parts is not exactly easy.

It is the task of the invention to provide an apparatus of the kind initially mentioned to which the mentioned disadvantages do not attach.

The invention is explained in more detail below, by way of example, with reference to the drawing.

Figure 2:
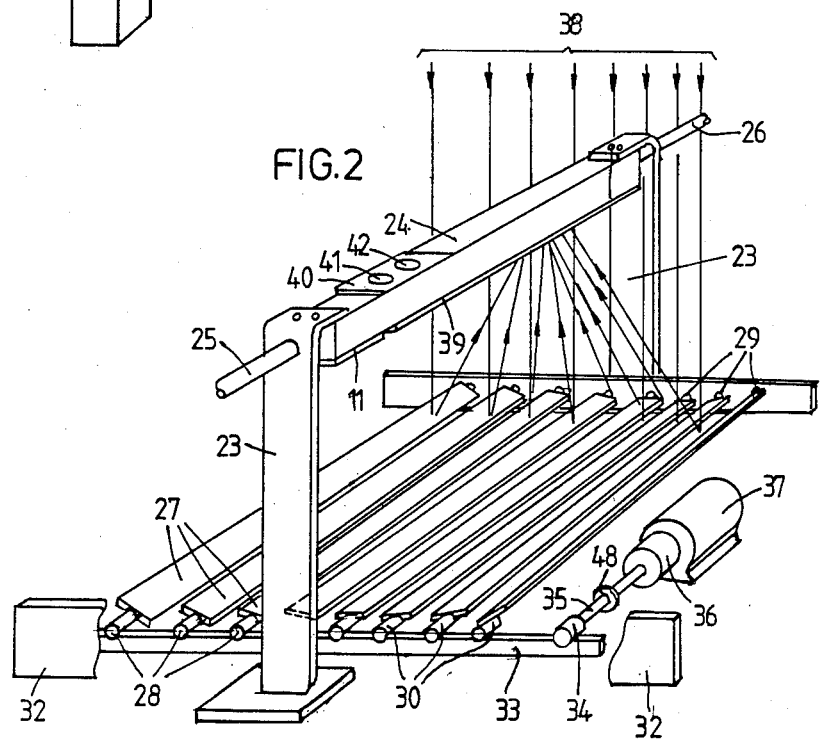
Figure 3:
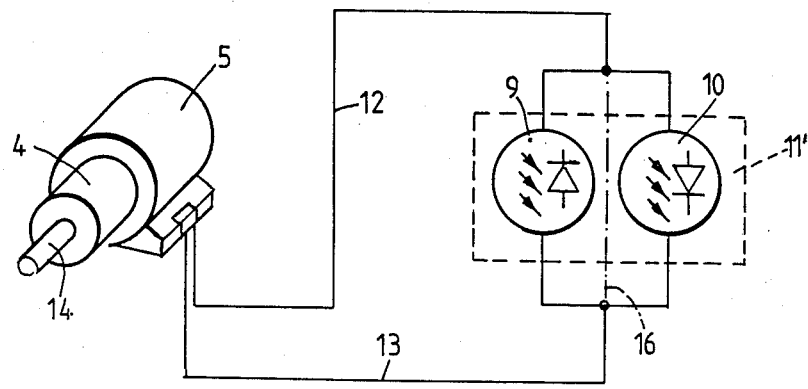
Figure 4:
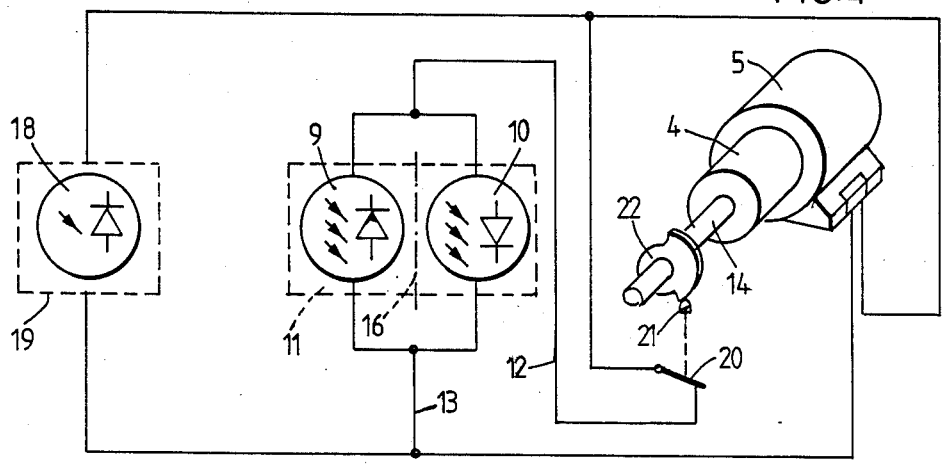
Figure 5:
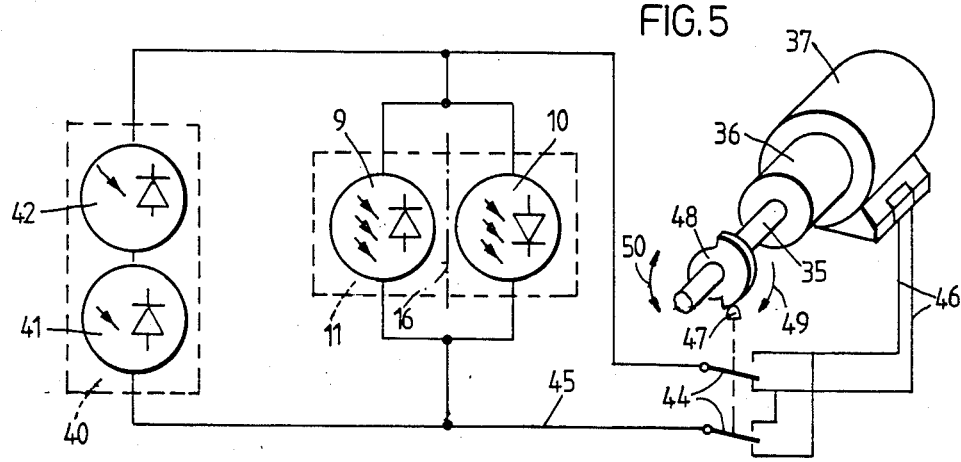

FIG. 1 shows a solar energy plant having a reflector, an absorber, and an embodiment of the apparatus according to the invention in simplified perspective representation, FIG. 2 another solar energy plant having a reflector assembled from strip-shaped reflector elements, an absorber, and another embodiment of the apparatus according to the invention in simplified perspective representation, FIG. 3 the elementary circuit diagram of a first simple embodiment of the apparatus according to the invention, FIG. 4 the elementary circuit diagram of a second embodiment of the apparatus according to the invention, and FIG. 5 the elementary circuit diagram of a third embodiment of the apparatus according to the invention.

FIG. 1 shows a solar energy plant having an at least approximately cylindrical parabolic reflector 1 which is rotatable about a swivel axis 2. The swivel axis 2 is mounted in vertically disposed supports 3 and rotation-connected via a reduction gear 4 to an electric motor 5. In the region of the upper ends of the supports 3 an absorber 6 is rigidly disposed. The absorber 6 is an elongated container, preferably of a metal. The outer sides of the container are black so that as great a proportion as possible of the solar energy striking it is converted into heat. Provided for at each of the end faces of the container 6 is one pipeline 7, 8, respectively, each, over which a heat carrier, for example water, is supplied to the container and carried off from the container, respectively. Because the container forming the absorber 6 is rigidly disposed, the pipelines can likewise be rigidly laid.

The distance between the reflector 1 and the absorber 6 is so chosen that the solar energy is concentrated on the underside of the absorber 6 not along a sharp focal line, but that an elongated focal spot results, the width of which is less than the width of the underside of the absorber 6.

The simplest embodiment of the apparatus according to the invention comprises, besides the electric motor 5, two solar cells 9 and 10 which are disposed at a location of the absorber 6 facing the reflector 1, i.e., on the underside of the absorber 6, on both sides of the longitudinal center line of the underside. These two solar cells are not directly visible in FIG. 1 but are only indicated by the arrow 9, 10. FIG. 3 shows the way in which the two solar cells 9 and 10 are connected to the electric motor 5. The two solar cells 9 and 10 can preferably be disposed on a support 11, in which connection the solar cells 9 and 10 can communicate heat-conductively with the absorber 6 via the support 11.

The solar cells 9 and 10 are connected in parallel oppositely to one another, i.e., they are connected in such a way that upon incident solar radiation they each generate a voltage up to polarities opposite to one another. The ones of the terminals of the solar cells 9 and 10 connected to one another are connected over a conductor 12 to the one terminal and the other terminals of the polar cells 9 and 10 are connected over a conductor 13 to the other terminal of the electric motor 5.

The electric motor 5 is a direct-current motor having a low internal resistance so that by means of the voltage delivered by the solar cells 9 and 10, it produces a torque sufficient to swivel the reflector 1. When the optical axis of the reflector 1 is aligned opposite the sun, the incidents sunrays, indicated in FIG. 1 by the arrows 15, are focused on the surface region which corresponds to the underside of the absorber 6. In this case the same amount of light per unit of time strikes each of the two solar cells 9 and 10 when they are disposed symmetrically with respect to the longitudinal center line of the underside of the absorber 6 represented by the dot-dash line 16 in FIG. 3. They therefore generate approximately equally high voltages, which are opposite to one another, however, so that a differential voltage occurs at the terminals of the electric motor 5. Through the apparent movement of the sun relative to FIG. 1, for instance toward the right, the focal spot focused on the underside of the absorber travels in the direction of the left-hand edge region of the underside of the absorber 6. This causes a smaller amount of light per unit of time to strike the solar cell 10 than strikes the solar cell 9. The solar cell 9 thus generates a larger voltage than the solar cell 10. The result of the differential voltage occurring is that the electric motor 5 swivels the reflector in the direction of the arrow 17. In this way the reflector 1 automatically follows the apparently moving sun, the focal spot being constantly focused on the underside of the absorber 6.

The above-described simple execution of the apparatus according to the invention functions faultlessly as long as the focal spot strikes one of the solar cells 9 or 10 at least partially. When, for example, cloudiness lasting for a fairly long time occurs during the day, the reflector 1 stands still because both solar cells 9 and 10 are not irradiated. If the cloudiness lasts longer, so that upon resumed sunshine the focal spot has travelled beyond the solar cell 9, no more differential voltage is delivered to the electric motor 5, and the reflector 1 does not move. A similar situation occurs when the reflector 1 is directed toward the west before or after sunset and the next morning the sun rises in the east.

With this simple embodiment, it is necessary to adjust the reflector 1 by hand or by other means so far that the focal spot strikes one of the two solar cells 9 or 10 at least partially.

In order to meet this disadvantage, the support 11 can, for example, be extended on both sides of the longitudinal center axis 16 of the underside of the absorber 6, as is depicted in dot-dash lines in FIG. 1. On the underside of the extended support 11' are disposed not only the two mentioned solar cells 9 and 10 but also additional non-depicted solar cells, the solar cells disposed on the left-hand part, relative to FIG. 1, of the extended support 11' being connected in parallel to the solar cell 9 and the solar cells disposed on the right-hand part of the extended support 11' being connected in parallel to the solar cell 10. The length of the support 11' and the number of additional solar cells are so chosen that the focal spot, in every position of the reflector 1 occurring in the normal operating condition of the plant, the focal spot strikes one of the solar cells disposed on the support 11'.

The advantage of this modified execution is that no switching means are needed in the circuit. On the other hand, however, a plurality of relatively expensive solar cells are necessary for the tracking control alone.

A similar effect as with the above-described extended support 11' and the number of additional solar cells can be achieved with the aid of the circuit depicted in FIG. 4, having merely one further solar cell 18. This circuit is described below in more detail with reference to FIG. 1.

The further solar cell 18 is directly connected to the terminals of the electric motor 5 and can be rigidly disposed at any location at which it can receive non-focused solar radiation the whole day. Preferably the further solar cell 18 is disposed on the top side of the absorber 6 and heat-conductively connected to the same so that the further solar cell 18 is cooled by the heat carrier. In advantageous manner the solar cell 18 is disposed on a heat-conductive support 19 which is fixed on the top side of the absorber.

The further solar cell is, as already mentioned, directly connected to the terminals of the electric motor. The conductor 12 of the parallel connection formed of the solar cells 9 and 10 is connected via a switching means, e.g., switch 20, to the winding of the electric motor 5. The switch 20 possesses an actuating part 21 which cooperates with a cam 22 mounted rotation-fast on the secondary shaft 14 of the reduction gear 4. The switch 20 is not depicted in FIG. 1.

The cam 22 is so formed and mounted on the secondary shaft 14 that it holds the switch 20 in the position depicted in FIG. 4 as long as the reflector 1 assumes a position which is between the morning position and the evening position. The switching flanks of the cam 22 are so formed that shortly before the optical axis of the reflector 1 is directed both in the evening position and in the morning position toward the respective horizon, the switch 20 is opened by the cam 22. Because the solar radiation decreases toward evening, and there is no longer sufficient or no energy for driving the tracking control, the electric motor 5, and thus also the reflector 1, stops in the evening position. When the sun shines anew the next day, the further solar cell 18 is irradiated, and the electric motor 5 moves the reflector 1 farther in the same direction of rotation as on the day before, the switch 20 being opened, and the reflector 1 being rotated farther in the same direction until it reaches its morning position. Shortly before, the switch 20 is again closed. After the focal spot has travelled over the solar cell 9 to the solar cell 10, the latter generates a countervoltage to the voltage generated by the solar cell 9 and 18. When the difference is small or nil, the electric motor 5, and thus the reflector 1, stands still, or it is automatically directed toward the sun by the differential voltage occurring through the apparent movement of the sun, in such a way that the focal spot is automatically focused on the underside of the absorber 6.

If cloudiness occurs during the day, whereby the electric motor 5 stands still because none of the solar cells 9, 10, or 18 delivers a voltage sufficient for operating the electric motor 5, the reflector 1 also remains in the position assumed shortly before the appearance of the cloudiness. If the cloudiness only lasts a short time, a part of the focal spot will still strike the solar cell 9, and the electric motor 5 causes the reflector 1 to follow up the new position of the sun. If, however, the cloudiness lasts so long that upon resumed sunshine the focal spot has already travelled beyond the solar cell 9, then merely the further solar cell 18 is exposed to the non-focused solar radiation. The voltage thereupon generated by it causes the electric motor 5 to readjust the reflector 1 until the focal spot again strikes the underside of the absorber completely.

This embodiment of the apparatus according to the invention can be used only for reflectors which are rotatable by more than 360°.

FIG. 2 shows another embodiment of a solar energy plant with a further embodiment of the apparatus according to the invention. Rigidly fixed to the upper end regions of two supports 23 anchored fast in the ground are the ends of an absorber 24. At one end of the absorber 24, a boreline 25 for supplying a liquid heat carrier, e.g., water, is disposed, and at the other end of the absorber 24 a pipeline 26 for evacuating the heat carrier from the absorber 24 is disposed. The reflector is formed by a number of strip-shaped reflector elements 27 swivellable about their longitudinal axis. Beyond each end-face side of the reflector elements these projects one journal 28, 29, respectively, each, one pinion 30 each being disposed between the outer end of the journals 28 and the associated end-outer end of the journals 28 and the associated end-face side. The journals 29 are mounted in bearings fixed along a straight line in a cross-beam 31, and the journals 28 are mounted in a similar manner in a bearing beam 32 of which, however, only the two end regions are visible. Each of the pinions 30 meshes with a rack 33 displaceable in its longitudinal direction. A pinion 34 further engages the toothing of the rack 33, which pinion is rotation-connected to a drive shaft 35 of a reduction gear 36. The reduction gear 36 is driven by an electric motor 37.

The individual, preferably plane, reflecting surface regions of each reflector element 27 form another angle with the plane defined by the row arrangement of the journals 28 and 29. It is thereby achieved that the solar radiation, indicated for example by arrows 38, are reflected on the underside of the absorber 24. In order that the focal spot always be focused on the underside of the reflector 24 even with the apparent movement of the sun, the reflectors are swivelled by the same angle, corresponding to the apparent solar movement, by the electric motor 37, the pinion 34, the racks 33, and the pinions 30.

The absorber 24 is a so-called hybrid absorber which comprises a container for the flow-through of the heat carrier and a support 39 mounted with a non-depicted solar cell arrangement. The solar cell arrangement is heat-conductively connected to the underside of the container of the absorber 24. The further above mentioned solar cells 9 and 10 of the apparatus according to the invention are furthermore heat-conductively fixed to the underside of the absorber 24 via their support 11. On the top side of the absorber 24, a support 40 with tw further solar cells 41 and 42 is disposed. The solar cells 41 and 42 are, contrary to the solar cells 9 and 10 as well as the solar cell arrangement, not exposed two the focused solar radiation but rather to the unfocused solar radiation.

In order for this system to operate properly it is necessary to choose and arrange the elements so that the motor may be driven by the difference in power between the two solar cells. In order to accomplish this, the individual reflector strips are mounted in bearings in the journals 28 and 29. Since the friction of the bearings is very low and the mass of the reflector is balanced, astonishingly little power is needed to move the reflector. Also, since the movement of the sun is very slow the tracking movement of the reflector is likewise very slow and accordingly the motor may be geared down by a very large factor. As mentioned above, this result can be accomplished using the proper choice of elements and a proper arrangement of the elements. Thus, by using low friction bearings and a high gearing ratio, it is possible to obtain this result.

In conformity with the wiring diagram according to FIG. 5, the two further solar cells 41 and 42 are connected in series, and this series connection is connected in parallel with the parallel connect formed of the solar cells 9 and 10. The series connection of the further solar cells 41 and 42 is so connected to the parallel-connected solar cells 9 and 10 that the solar cells 41 and 42 generate a voltage with the same polarity as the solar cell 9. The one terminals of the solar cells 9, 10, and 42 are connected over a conductor 43 to a switching means, e.g., to a double-pole switch 44. The other terminals of the solar cells 9, 10 and 41 are connected over a conductor 45 to the switch 44. The other side of the switch 44 is connected over conductor 46 to the terminals of the electric motor 37. The switch 44 possesses an actuating component 47 which cooperates with a cam 48 fixed on the secondary shaft 35 of the reduction gear 36. The switch 44 is not depicted in FIG. 2.

The cam 48 is so formed and fixed on the secondary shaft 35 that the switch 44 is in the position depicted in FIG. 5 while the optical axis of the reflector formed of the reflector elements 27 moves from the morning position into the evening position. The switching flanks of the cam 48 are so disposed that the switch 44 is moved into the non-depicted position when the optical axis of the said reflector reaches the respective horizon.

The position shown in FIG. 5 of the cam 48 with respect to the actuating component 47 corresponds to the morning position of the reflector 27. The incident morning sunrays are focused on the solar cells 9 and 10. With the apparently moving sun, the reflector 27 is automatically swivelled step-wise in accordance with the differential voltage occurring, so that the sunrays are focused during the entire day on the underside of the absorber 24, thus on the solar cell arrangement on the support 39. At this time, electrical energy is delivered to a load by the solar cell arrangement, and the heat carrier is heated.

When towards evening the energy produced in the solar cells 9 and 10, and 41 and 42, respectively, by the weaker solar radiation is no longer sufficient to drive the electric motor 37, the latter and the reflector elements 27 stand still. During the day, the drive shaft 35 has rotated in the direction of the arrow 49. The next morning, the sunrays strike only the solar cells 41 and 42 because the reflector is still in the evening position. When the unfocused radiation incident on the solar cells 41 and 42 is sufficiently great, the motor 37 turns the secondary shaft 49 first farther in the same direction as is indicated by the arrow 49, and this so far until the switch 44 is moved by the cam 48 into the position not depicted in FIG. 5. Through the actuation of the switch 44, the polarity of the voltage supplied to the electric motor 37 is changed, and thus the electric motor 37 rotates further in the opposite direction, see arrow 50. The switch 44 is so formed that it remains in the newly assumed position until the other switching flank of the cam 48 actuates the actuating component 47. This is the case when the electric motor 37 has rotated the drive shaft 35 by an angle until the reflector elements 27 have reached their morning starting position. After the renewed actuation of the actuating component 47, the switch 44 is changed back into its position depicted in FIG. 5, and the polarity of the voltage generated by the solar cells 41 and 42 is again changed, and the electric motor 37 rotates further again in the original direction in accordance with the arrow 49. The further rotation lasts until the incident solar radiation is focused on the solar cells 9 and 10.

If heavy cloudiness occurs during the day, so that the electric voltage generated in the solar cells 9 and 10 no longer suffices to drive the electric motor 37, the same and thus also all reflector elements 27 stand still. If the sun shines again after a relatively short time, at least a part of the focal spot strikes the solar cell, and the voltage generated in it ensures that the electric motor 37 readjusts the reflector elements 27 so that the focal spot again strikes the underside of the absorber 24, thus the solar cell arrangement on the support 39. If the cloudiness continues for a fairly long time, so that upon resumed sunshine the focal spot has gotten outside of the underside of the absorber 24, a voltage is nevertheless generated in the further solar cells 41 and 42 which are irradiated only by unfocused solar radiation, which voltage drives the electric motor 37 in order to rotate the secondary shaft 35 in the direction indicated by the arrow 49 until the sunrays are again focused on the underside of the absorber 24. In order to guarantee a sure return of the reflector elements 27 from their evening position into their morning position, another switch likewise actuatable by the actuating member 47 is connected to the switch 44 at the location designated as 51. This switch is closed when the switch 44 is in the position depicted in FIG. 5 and opened when the switch 44 is in the position not depicted in the figure. This additional switch guarantees that the return movement from the evening position into the morning position is not disturbed by the voltage possibly generated in the solar cell 10. The last-described embodiment of the apparatus according to the invention is especially suited for the tracking control of a reflector which is not rotatable by a full 180°.

We claim:

1. A solar power plant, comprising:
a stationary solar radiation collector;
a balanced reflector having a low friction mounting adjustable about a swivel axis for focusing solar radiation;
an adjusting mechanism for adjusting said reflector to direct the focused solar radiation onto said collector;
an electric motor having sufficient torque to drive said adjusting mechanism through a reduction gear having a high gear ratio, and
as least two solar cells disposed on said collector, said solar cells being connected in a parallel circuit opposite to one another, said parallel circuit being directly connected to said motor so that upon irradiation of said solar cells with focused solar radiation electrical voltages are produced which counteract one another and which drive said motor without amplification, said produced voltages being the sole supply of power to said motor.

2. A solar power plant, comprising:
a stationary solar radiation collector;
a balanced reflector adjustably mounted for low friction movement about a swivel axis for focusing solar radiation;
an adjusting mechanism for adjusting said reflector to direct the focused solar radiation onto said collector;
an electric motor for driving said adjusting mechanism having sufficient torque to drive said adjusting mechanism through a reduction gear having a high gear ratio;
as least two solar cells disposed on said collector, said solar cells being connected in a parallel circuit opposit to one another so that upon irradiation of said solar cells with focused solar radiation, electrical voltages are produced which counteract one another, said parallel connection being connected directly to said electric motor without amplification to be the sole supply of power to said electric motor.

3. A solar power plant, comprising:
a stationary solar radiation collector;
a reflector mounted on low friction bearings and adjustable about a swivel axis for focusing solar radiation;
an adjusting mechanism for adjusting said reflector to direct the focused solar radiation onto said collector;
an electric motor with low internal resistance connected to a reduction gear having a high gear ratio for driving said adjusting mechansim; and
at least two solar cells disposed on the side of said collector nearest said reflector, said solar cells being connected in a parallel circuit opposite to one another so that upon irradiation of said solar cells with focused solar radiation, electrical voltages are produced which counteract one another, said parallel connection being connected directly to said electric motor to supply power to said electric motor.

4. Apparatus according to claim 3 wherein said electric motor comprises a winding and the winding of the electric motor is connected via a doublepole switch means to the said parallel connection, the switch means comprises an actuating member for determining the position of the reflector, and at least one further solar cell to be irradiated by unfocused solar radiation is connected in parallel to the said parallel connection.

5. Apparatus according to claim 3 wherein said electric motor comprises a winding and the winding of the electric motor is connected via a switching means to the said parallel connection, the switching means comprises an actuating member for determining the position of the reflector, and at least a further solar cell is connected directly to the winding of the electric motor.

6. A plant according to claim 3, further comprising a further solar cell (18) which is disposed at a location so that unfocused solar radiation impinges on the further solar cell.

7. A plant according to claim 3 characterized in that the further solar cell (18) is disposed on the side of the collector (6) facing the sun when the plant is in operation.

8. A plant according to claim 6, 7 or 3 wherein the collector is an elongated receptacle (6) for the conveyance therethrough of a liquid heat carrier.

9. A plant according to claim 8 wherein a solar cell arrangement for supplying electric energy is disposed on the side of the receptacle facing the reflector (27) thereby the liquid heat carrier serves to cool the majority of the solar cells.

* * * * *